(12) United States Patent
Zhao

(10) Patent No.: US 11,373,080 B1
(45) Date of Patent: Jun. 28, 2022

(54) RADIO FREQUENCY IDENTIFICATION HOST

(71) Applicant: Shenzhen Wins Electronic Technology Co., Ltd., Guangdong (CN)

(72) Inventor: Shengfei Zhao, Guangdong (CN)

(73) Assignee: Shenzhen Wins Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 17/507,821

(22) Filed: Oct. 22, 2021

(30) Foreign Application Priority Data

Jun. 24, 2021 (CN) .......................... 202121417470.X

(51) Int. Cl.
    *G06K 19/077* (2006.01)
    *H04B 5/00* (2006.01)
(52) U.S. Cl.
    CPC ..... *G06K 19/07758* (2013.01); *H04B 5/0062* (2013.01)
(58) Field of Classification Search
    CPC .................. G06K 19/07758; H04B 5/0062
    See application file for complete search history.

(56) References Cited

U.S. PATENT DOCUMENTS

| 5,561,269 | A | * | 10/1996 | Robertson | ............ | H02G 15/113 |
| | | | | | | 174/92 |
| 9,270,098 | B2 | * | 2/2016 | Isaacks | .................... | H02G 3/08 |
| 2008/0276663 | A1 | * | 11/2008 | Hu | ....................... | H05K 5/0221 |
| | | | | | | 70/2 |
| 2012/0227788 | A1 | * | 9/2012 | Lundahl | .................. | H02S 20/30 |
| | | | | | | 136/246 |

\* cited by examiner

*Primary Examiner* — Omer S Khan
(74) *Attorney, Agent, or Firm* — Horizon IP Pte Ltd.

(57) ABSTRACT

A radio frequency identification host, which includes: a host body (1) for radio frequency identification, a mounting structure (2) is provided at one end of the host body (1) for fixing the radio frequency identification host body (1) on an external holding pole, the mounting structure (2) includes a first mounting frame (21) fixedly connected to one end of the host body (1), a hinge of the first mounting frame (21) is connected with a second mounting frame (22), and the second mounting frame (22) is fixedly connected to the first mounting frame (21) by bolts (23).

6 Claims, 2 Drawing Sheets

RADIO FREQUENCY IDENTIFICATION HOST

TECHNICAL FIELD

The present disclosure relates to the technical field of radio frequency identification host connection, and more particularly, to a radio frequency identification host.

BACKGROUND

RFID is the abbreviation of Radio Frequency Identification. The principle of RFID is to carry out non-contact data communication between the reader and the tag to achieve the purpose of identifying the target. RFID has a wide range of applications, typical applications include animal chips, car chip anti-theft devices, access control, parking lot control, production line automation, and material management.

In the existing technology, a radio frequency identification host is provided on the barrier gate system, and the mounting structure of the radio frequency identification host is relatively complicated and inconvenient to mount; in addition, multiple cables are connected to the interface of the radio frequency identification host, which makes it inconvenient to mount.

Therefore, how to provide a radio frequency identification host to facilitate mounting has become a technical problem to be addressed urgently.

SUMMARY

The technical problem to be addressed by the present disclosure is how to provide a radio frequency identification host to facilitate mounting.

For this purpose, according to a first aspect, an embodiment of the present disclosure discloses a radio frequency identification host, which includes: a host body for radio frequency identification, a mounting structure is provided at one end of the host body for fixing the radio frequency identification host body on an external holding pole, the mounting structure includes a first mounting frame fixedly connected to one end of the host body, a hinge of the first mounting frame is connected with a second mounting frame, and the second mounting frame is fixedly connected to the first mounting frame by bolts.

According to a further embodiment of the present disclosure, a junction box is provided at one end of the host body for facilitating the connection of cables, and the host body is provided with a locking device for locking the junction box.

According to a further embodiment of the present disclosure, the locking device includes a locking table arranged on one side of the junction box, the host body is provided with a hinged locking buckle, and locking buckle and the locking table are fixed by clamping.

According to a further embodiment of the present disclosure, the junction box is hingedly connected with the host body.

According to a further embodiment of the present disclosure, a corrugated tube for protecting cables is provided on the junction box.

According to a further embodiment of the present disclosure, one side of the host body is provided with a first interface, a second interface and a third interface.

According to a further embodiment of the present disclosure, the first mounting frame is provided with a first mounting groove adapted to the external holding pole, and the second mounting frame is provided with a second mounting groove adapted to the external holding pole.

According to a further embodiment of the present disclosure, opposite two ends of the host body are both provided with heat dissipation strips for dissipating heat of the host body.

The present disclosure has the following beneficial effects: the mounting structure plays the role of mounting, through the locking cooperation of the first mounting frame, the second mounting frame and the bolts, the radio frequency identification host can be mounted on an external holding pole, thereby facilitating the mounting of the radio frequency identification host.

BRIEF DESCRIPTION OF DRAWINGS

In order to more clearly illustrate the specific embodiments of the present disclosure or the technical solutions in the existing technology, the following will briefly describe the drawings that need to be used in the specific embodiments or the description of the existing technology. Apparently, the drawings in the following description are some embodiments of the present disclosure, for those of ordinary skill in the art, other drawings can be obtained based on these drawings without creative work.

REFERENCE NUMERALS

Figure 1:
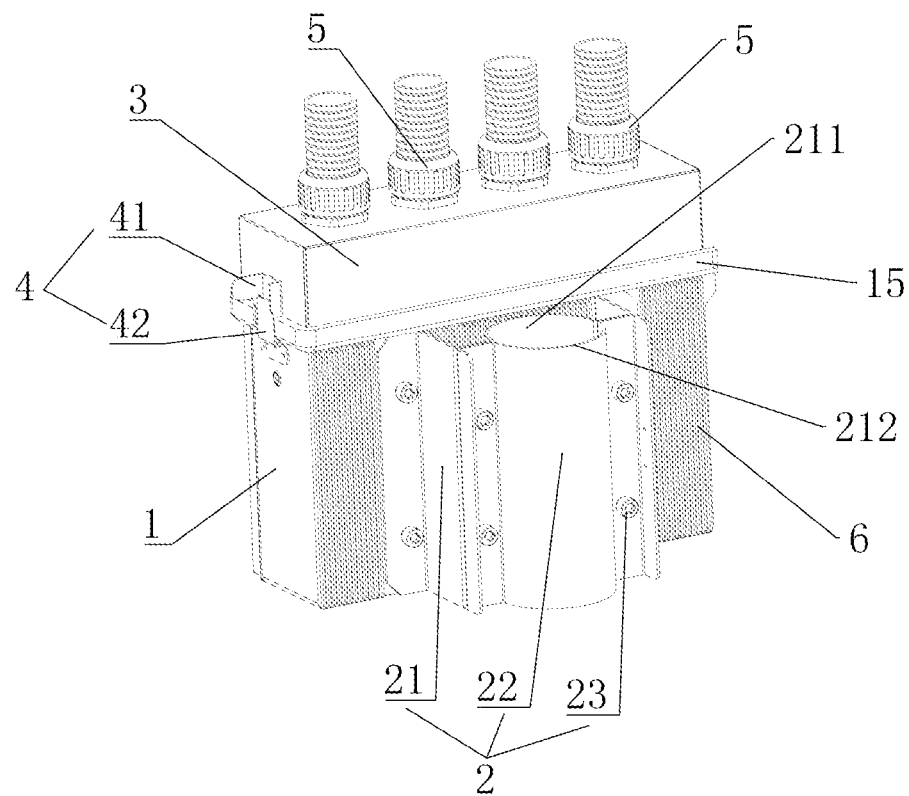
FIG. 1 is a schematic diagram of a three-dimensional structure of a radio frequency identification host disclosed in an embodiment.

1. host body; 11. first interface; 12. second interface; 13. third interface; 14. USB interface; 15. sealing ring; 2. mounting structure; 21. first mounting frame; 211. first mounting groove; 22. second mounting frame; 212. second mounting groove; 23. bolts; 3. junction box; 4. locking device; 41. locking table; 42. locking buckle; 5. corrugated tube; 6. heat dissipation strip.

DETAILED DESCRIPTION

In order to make the objectives, technical solutions, and advantages of the present disclosure clearer, the following further describes the present disclosure in detail with reference to the accompanying drawings and embodiments. It should be understood that the specific embodiments described herein are only used to explain the present disclosure, but not used to limit the present disclosure.

In the description of the present disclosure, it should be noted that, unless otherwise clearly specified and limited, the terms "mounted", "connected with", and "connected to" should be understood in a broad sense, for example, it can be a fixed connection, a detachable connection, or an integral connection; it can be a mechanical connection or an electrical connection; it can be a direct connection, or indirect connection through an intermediate medium, or it can be the internal connection between two components, which can also be a wireless connection or a wired connection. For those of ordinary skill in the art, the specific meanings of the above-mentioned terms in the present disclosure can be understood in specific situations.

In the description of the present disclosure, it should be noted that the orientation or positional relationship indicated by the terms "center", "upper", "lower", "left", "right", "vertical", "horizontal", "inner", "outer", etc. are based on the orientation or positional relationship shown in the drawings, it is only for the convenience of describing the present disclosure and simplifying the description, rather than indicating or implying that the device or element referred to must have a specific orientation, be configured and operated in a specific orientation, and therefore cannot be understood as a limitation to the present disclosure. In addition, the terms "first", "second", and "third" are only used for descriptive purposes, and cannot be understood as indicating or implying relative importance.

In addition, the technical features involved in the different embodiments of the present disclosure described below can be combined with each other as long as they do not conflict with each other.

The present disclosure discloses a radio frequency identification host, as shown in FIG. 1, which includes: a host body 1 for radio frequency identification, a mounting structure 2 is provided at one end of the host body 1 for fixing the radio frequency identification host body on an external holding pole, the mounting structure 2 includes a first mounting frame 21 fixedly connected to one end of the host body 1, a hinge of the first mounting frame 21 is connected with a second mounting frame 22, and the second mounting frame 22 is fixedly connected to the first mounting frame 21 by bolts 23.

It should be noted that the mounting structure 2 plays the role of mounting, through the locking cooperation of the first mounting frame 21, the second mounting frame 22 and the bolts 23, the radio frequency identification host can be mounted on an external holding pole, thereby facilitating the mounting of the radio frequency identification host.

Figure 3:
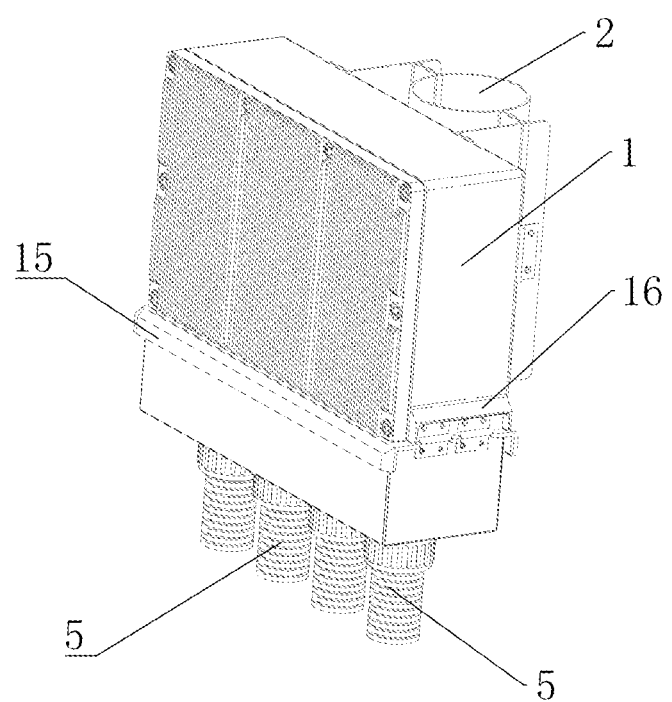
FIG. 3 is a three-dimensional schematic diagram of a radio frequency identification host disclosed in an embodiment.

As shown in FIG. 1 and FIG. 3, a junction box 3 is provided at one end of the host body 1 for facilitating the connection of cables, and the host body 1 is provided with a locking device 4 for locking the junction box 3. In the specific implementation process, a waterproof gasket is provided between the host body 1 and the junction box 3, and the waterproof gasket is fixed by a sheet metal pressing block. One end of the host body 1 is provided with a sealing ring 15 for convenient waterproofing. One side of the host body 1 is provided with a waterproof baffle frame 16 for preventing rainwater from entering the junction box 3, and the waterproof baffle frame 16 and the host body 1 are integrally formed.

As shown in FIG. 1, the locking device 4 includes a locking table 41 arranged on one side of the junction box 3, the host body 1 is provided with a hinged locking buckle 42, and locking buckle 42 and the locking table 41 are fixed by clamping.

As shown in FIG. 1, the junction box 3 is hingedly connected with the host body 1.

As shown in FIG. 1, a corrugated tube 5 for protecting cables is provided on the junction box 3. In the specific implementation process, the number of the corrugated tube 5 is set to four.

Figure 2:
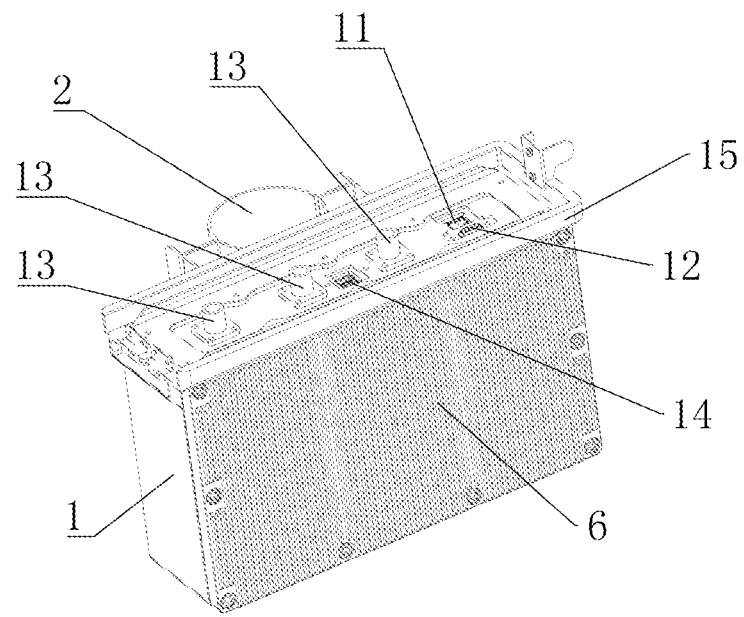
FIG. 2 is a schematic diagram of a partial structure of a radio frequency identification host disclosed in an embodiment.

As shown in FIG. 1 and FIG. 2, one side of the host body 1 is provided with a first interface 11, a second interface 12 and a third interface 13. In the specific implementation process, the host body 1 is also provided with a USB interface for debugging.

As shown in FIG. 1, the first mounting frame 21 is provided with a first mounting groove 211 adapted to the external holding pole, and the second mounting frame 22 is provided with a second mounting groove 212 adapted to the external holding pole. In the specific implementation process, both the first mounting groove 211 and the second mounting groove 212 are arranged in an arc shape.

As shown in FIG. 1, opposite two ends of the host body 1 are both provided with heat dissipation strips 6 for dissipating heat of the host body 1.

Operating principle: the mounting structure 2 plays the role of mounting, through the locking cooperation of the first mounting frame 21, the second mounting frame 22 and the bolts 23, the radio frequency identification host can be mounted on an external holding pole, thereby facilitating the mounting of the radio frequency identification host.

Apparently, the foregoing embodiments are merely examples for clear description, and are not intended to limit the implementation manners. For those of ordinary skill in the art, other changes or modifications in different forms can be made on the basis of the above description. It is not necessary and impossible to list all the implementation methods here. The apparent changes or modifications derived from this are still within the protection scope of the present disclosure.

What is claimed is:

1. A radio frequency identification host, comprising:

a host body for radio frequency identification, a mounting structure is provided at one end of the host body for fixing the host body on an external holding pole, the mounting structure comprises a first mounting frame fixedly connected to one end of the host body, a hinge of the first mounting frame is connected with a second mounting frame, and the second mounting frame is fixedly connected to the first mounting frame by bolts, wherein, a junction box is provided at one end of the host body for facilitating the connection of cables, and the host body is provided with a locking device for locking the junction box, wherein, the locking device comprises a locking table arranged on one side of the junction box, the host body is provided with a hinged locking buckle, and locking buckle and the locking table are fixed by clamping.

2. The radio frequency identification host of claim 1, wherein, the junction box is connected with the host body via a second hinge.

3. The radio frequency identification host of claim 1, wherein, a corrugated tube for protecting cables is provided on the junction box.

4. The radio frequency identification host of claim 1, wherein, one side of the host body is provided with a first interface, a second interface and a third interface.

5. The radio frequency identification host of claim 1, wherein, the first mounting frame is provided with a first mounting groove adapted to the external holding pole, and the second mounting frame is provided with a second mounting groove adapted to the external holding pole.

6. The radio frequency identification host of claim 1, wherein, opposite two ends of the host body are both provided with heat dissipation strips for dissipating heat of the host body.

* * * * *